US012530586B2

(12) United States Patent
He et al.

(10) Patent No.: US 12,530,586 B2
(45) Date of Patent: Jan. 20, 2026

(54) METHOD AND APPARATUS FOR TRAINING DEEP LEARNING MODEL

(71) Applicant: Beijing Baidu Netcom Science and Technology Co., Ltd., Beijing (CN)

(72) Inventors: Tianjian He, Beijing (CN); Yi Liu, Beijing (CN); Daxiang Dong, Beijing (CN); Yanjun Ma, Beijing (CN); Dianhai Yu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 1152 days.

(21) Appl. No.: 17/218,033

(22) Filed: Mar. 30, 2021

(65) Prior Publication Data

US 2021/0216875 A1 Jul. 15, 2021

Related U.S. Application Data

(63) Continuation of application No. PCT/CN2020/095192, filed on Jun. 9, 2020.

(30) Foreign Application Priority Data

Nov. 25, 2019 (CN) .......................... 201911162586.0

(51) Int. Cl.
*G06N 3/084* (2023.01)
*G06N 3/10* (2006.01)

(52) U.S. Cl.
CPC ............... *G06N 3/084* (2013.01); *G06N 3/10* (2013.01)

(58) Field of Classification Search
CPC .......... G06N 3/084; G06N 3/10; G06N 3/045; G06N 3/063; G06N 3/105; G06N 3/0499;
(Continued)

(56) References Cited

U.S. PATENT DOCUMENTS

| 10,880,384 | B1 * | 12/2020 | Li | ........................... G10L 15/22 |
| 2019/0073590 | A1 * | 3/2019 | Wu | ........................ G06N 3/045 |
| 2020/0042362 | A1 * | 2/2020 | Cui | ........................ G06V 10/82 |

FOREIGN PATENT DOCUMENTS

| CN | 107766148 A | 3/2018 |
| CN | 109902818 A | 6/2019 |

(Continued)

OTHER PUBLICATIONS

Dunner, C. et al., "Efficient Use of Limited-Memory Accelerators for Linear Learning on Heterogeneous Systems", 31st Conference on Neural Information Processing Systems (NIPS 2017), 18 pages.

(Continued)

*Primary Examiner* — Alexey Shmatov
*Assistant Examiner* — Devika S Maharaj
(74) *Attorney, Agent, or Firm* — Weaver Austin Villeneuve & Sampson LLP (57) ABSTRACT

A method for training a deep learning model may include: acquiring model description information and configuration information of a deep learning model; segmenting the model description information into at least two sections based on segmentation point variable in the configuration information, and loading the model description information to a corresponding resource to run; inputting a batch of training samples into a resource corresponding to a first section of model description information, then starting training and using obtained context information as an input of a resource corresponding to a subsequent section of model description information; and so on until an operation result of a resource corresponding to a final section of model description information is obtained; if a training completion condition is met, outputting a trained deep learning model; and otherwise, keeping on acquiring a subsequent batch of training samples (Continued)

and performing the above training steps until the condition is met.

18 Claims, 5 Drawing Sheets

(58) Field of Classification Search
CPC .... G06N 3/09; G06N 3/098; G06F 2209/509; G06F 9/5044; G06F 9/5066; G06F 18/214
See application file for complete search history.

(56) References Cited

FOREIGN PATENT DOCUMENTS

| | | |
|---|---|---|
| CN | 109976903 A | 7/2019 |
| CN | 110889492 A | 3/2020 |
| EP | 3 561 738 A1 | 10/2019 |
| JP | 2018018220 A | 2/2018 |
| JP | 2019185784 A | 10/2019 |
| WO | WO-2016189675 A1 | 12/2016 |
| WO | WO 2018/085703 A1 | 5/2018 |

OTHER PUBLICATIONS

Zhan, J. et al., "Pipe-torch: Pipeline-Based Distributed Deep Learning in a GPU Cluster with Heterogeneous Networking", 2019 Seventh International Conference on Advanced Cloud and Big Data (CBD), IEEE DOI 10.1109/CBD.2019.00020, 6 pages.
Japanese Decision to grant dated Feb. 15, 2022 in JP Application No. 2020-572679.

* cited by examiner

METHOD AND APPARATUS FOR TRAINING DEEP LEARNING MODEL

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, and specifically to a method and apparatus for training a deep learning model.

BACKGROUND

As current deep learning models develop in a plurality of directions such as deeper level, wider representation, and more complex structure, GPUs (Graphics Processing Units) having high-efficient computing power have become indispensable computing resources in this field. Common parallelism solutions are divided into model parallelism and data parallelism.

The technical solution of model parallelism may allocate all model parameters to different devices for calculation, and each device maintains a part of the parameters. Since the calculation of different devices depends on calculation context of previous devices, in order to improve the utilization rate of a computing device (such as GPU), a model parallelism pipeline splits a large batch of data into a plurality of small batches, so that calculation of different small batches of data can be executed concurrently in a plurality of computing devices. The model parallelism pipeline may also be subdivided into two types: synchronous computing and asynchronous computing. In the synchronous computing mode, all computing devices may block to wait for context required for backward calculation after completing forward calculation tasks of all the small batches or wait for parameter synchronization update after completing all the backward calculation, resulting in insufficient use of the computing devices. In the asynchronous computing mode, calculation of different large batches may be performed at the same time, while the backward calculation of different small batches and the parameter update are moved forward as much as possible.

Data parallelism is another parallelism solution. A data parallelism pipeline allocates computing devices to different batches of data. Computing between the devices naturally has the characteristic of concurrency, and the device utilization rate is high.

SUMMARY

Embodiments of the present disclosure propose a method and apparatus for training a deep learning model.

In a first aspect, an embodiment of the present disclosure provides a method for training a deep learning model, the method including: acquiring model description information and configuration information of a deep learning model, the model description information including a variable and an operation, and the configuration information including a segmentation point variable and names of resources to be allocated to sections; segmenting the model description information into at least two sections based on the segmentation point variable in the configuration information, and loading the model description information to a corresponding resource to run according to the names of the resources to be allocated to the sections; performing following training steps: acquiring a batch of training samples and inputting the batch of training samples into a resource corresponding to a first section of model description information, starting training and saving an obtained intermediate result in first context information; inputting the first context information to a resource corresponding to a subsequent section of model description information to obtain second context information; and so on until an operation result of a resource corresponding to a final section of model description information is obtained; if a training completion condition is met, outputting a trained deep learning model; and otherwise, keeping on acquiring a subsequent batch of training samples and performing the above training steps until the training completion condition is met.

In some embodiments, the configuration information further includes a proportion of the resources to be allocated to the sections; and the loading the model description information to the corresponding resource to run according to the names of the resources to be allocated to the sections, includes: calculating numbers of to-be-allocated resources according to the proportion of the resources to be allocated to the sections; and loading the model description information to the corresponding resource to run according to the names of the resources to be allocated to the sections and the numbers.

In some embodiments, the segmenting the model description information into at least two sections based on the segmentation point variable in the configuration information, includes: determining a forward part that ends with the segmentation point variable as a first section; determining a remaining forward part starting from the segmentation point variable plus a part from a loss part to a gradient variable corresponding to the segmentation point variable as a second section; and determining a remaining reverse part starting from the gradient variable corresponding to the segmentation point variable as a third section.

In some embodiments, the acquiring the model description information and the configuration information of the deep learning model, includes: determining a conversion variable between an operation with frequent memory interaction and a computationally intensive operation as the segmentation point variable, based on an operation of the model description information; allocating the operation with frequent memory interaction to a CPU for execution; and allocating the computationally intensive operation to a GPU for execution.

In some embodiments, the method further includes: splitting the training samples into a predetermined number of copies; training using each copy of training sample to obtain a set of parameters of the deep learning model; and synchronizing each set of parameters of the deep learning model once every certain round.

In some embodiments, the context information is transferred through a queue.

In a second aspect, an embodiment of the present disclosure provides an apparatus for training a deep learning model, the apparatus including: an acquisition unit, configured to acquire model description information and configuration information of a deep learning model, the model description information including a variable and an operation, and the configuration information including a segmentation point variable and names of resources to be allocated to sections; a segmentation unit, configured to segment the model description information into at least two sections based on the segmentation point variable in the configuration information, and load the model description information to a corresponding resource to run according to the names of the resources to be allocated to the sections; a training unit, configured to perform following training steps: acquiring a batch of training samples and inputting the batch of training samples into a resource corresponding to a first section of model description information, starting training and saving an obtained intermediate result in first context information; inputting the first context information to a resource corresponding to a subsequent section of model description information to obtain second context information; and so on until an operation result of a resource corresponding to a final section of model description information is obtained; if a training completion condition is met, outputting a trained deep learning model; and an iteration unit, configured to, if the training completion condition is not met, keep on acquiring a subsequent batch of training samples and perform the above training steps until the training completion condition is met.

In some embodiments, the configuration information further includes a proportion of the resources to be allocated to the sections; and the segmentation unit is further configured to: calculate numbers of to-be-allocated resources according to the proportion of the resources to be allocated to the sections; and load the model description information to the corresponding resource to run according to the names of the resources to be allocated to the sections and the numbers.

In some embodiments, the segmentation unit is further configured to: determine a forward part that ends with the segmentation point variable as a first section; determine a remaining forward part starting from the segmentation point variable plus a part from a loss part to a gradient variable corresponding to the segmentation point variable as a second section; and determine a remaining reverse part starting from the gradient variable corresponding to the segmentation point variable as a third section.

In some embodiments, the acquisition unit is further configured to: determine a conversion variable between an operation with frequent memory interaction and a computationally intensive operation as the segmentation point variable, based on an operation of the model description information; allocate the operation with frequent memory interaction to a CPU for execution; and allocate the computationally intensive operation to a GPU for execution.

In some embodiments, the apparatus further includes a merging unit, configured to: split the training samples into a predetermined number of copies; train using each copy of training sample to obtain a set of parameters of the deep learning model; and synchronize each set of parameters of the deep learning model once every certain round.

In some embodiments, the context information is transferred through a queue.

In a third aspect, an embodiment of the present disclosure provides an electronic device, the device electronic including: one or more processors; and a storage apparatus, storing one or more programs thereon, where the one or more programs, when executed by the one or more processors, cause the one or more processors to implement the method according to the first aspect.

In a fourth aspect, an embodiment of the present disclosure provides a computer readable medium, storing a computer program thereon, where the program, when executed by a processor, implements the method according to the first aspect.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

The method and apparatus for training a deep learning model provided by embodiments of the present disclosure, propose an asynchronous pipeline framework to realize free collocation of heterogeneous computing devices (not limited to CPU, GPU and network card, etc., and specific calculations are supported by operations), in order to give full play to the characteristics of different devices, such as performing calculation and update operations of embedding lookup in the CPU with faster memory interaction, and performing computationally intensive operations such as matrix multiplication in the GPU with faster calculating speed. In addition, by allocating different proportions of computing resources to the operations having different characteristics and executing the operations asynchronously and concurrently, it may give full play to the computing power of different computing devices and an overall throughput may be improved.

Figure 1:
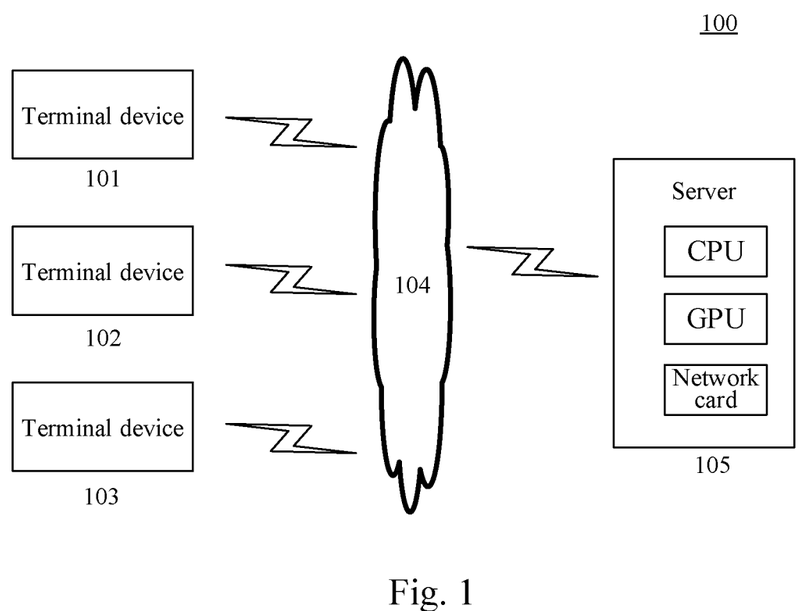
FIG. 1 is a diagram of an example system architecture in which an embodiment of the present disclosure may be implemented.

FIG. 1 illustrates an example system architecture 100 in which a method for training a deep learning model or an apparatus for training a deep learning model according to embodiments of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless communication links, or optic fibers.

A user may use the terminal devices 101, 102, 103 to interact with the server 105 through the network 104 to receive or send messages, and so on. Various communication client applications, such as model training applications, web browser applications, shopping applications, search applications, instant messaging tools, email clients, and social platform software, may be installed on the terminal devices 101, 102, and 103.

The terminal devices 101, 102, 103 may be hardware or software. When the terminal devices 101, 102, 103 are hardware, the terminal devices 101, 102, 103 may be various electronic devices that support uploading training samples, including but not limited to smart phones, tablet computers, E-book readers, MP3 players (Moving Picture Experts Group Audio Layer III), MP4 (Moving Picture Experts Group Audio Layer IV) players, laptop portable computers and desktop computers, etc. When the terminal devices 101, 102, 103 are software, the terminal devices 101, 102, 103 may be installed in the electronic devices listed above. The terminal devices 101, 102, 103 may be implemented as a plurality of pieces of software or software modules (for example, for providing distributed services), or as a single piece of software or software module, which is not specifically limited herein.

The server 105 may be a server that provides various services, such as a backend training server that provides support for a deep learning model used on the terminal devices 101, 102, and 103. The backend training server may process such as analyze a received training request including training samples and other data, and feed back a processing result (for example, a trained deep learning model) to the terminal devices.

A computing unit of the server 105 is generally composed of three parts: CPU (central processing unit), GPU, and network card (for the convenience of description, communication between network cards is regarded as computing). Because these three parts have different functions and characteristics, in a system, we usually perform the division of work as follows.

The CPU is good at flow control and logic processing due to its versatile functions, and the CPU has strong processing power especially for irregular data structures or unpredictable storage structures. In a deep learning task, the CPU is generally responsible for data loading, preprocessing and dumping, starting data transmission and function calling on the GPU, starting network transmission, etc.

The GPU is better at data parallel computing due to its many cores, and the GPU has a huge speed advantage especially for regular data structures or predictable storage modes. Therefore, in a deep learning task, the GPU is generally responsible for calculation and is the most critical element in deep learning.

The network card is responsible for the upload and download of data and models, and the communication in distributed training.

Obviously, in order to improve the utilization rate of the GPU, on the one hand, an operation having a low GPU utilization rate should be transferred to the CPU for execution, and on the other hand, calculations between various computing devices should be executed concurrently, so as to avoid GPU idleness caused by serial computing of the CPU, the GPU, and the network card.

It should be noted that the server may be hardware or software. When the server is hardware, the server may be implemented as a distributed server cluster composed of a plurality of servers, or as a single server. When the server is software, the server may be implemented as a plurality of pieces of software or software modules (for example, a plurality of pieces of software or software modules for providing distributed services) or as a single piece of software or software module, which is not specifically limited herein.

It should be noted that the method for training a deep learning model provided by embodiments of the present disclosure is generally performed by the server 105. Accordingly, the apparatus for training a deep learning model is generally provided in the server 105.

It should be understood that the numbers of terminal devices, networks and servers in FIG. 1 are merely illustrative. Depending on the implementation needs, there may be any number of terminal devices, networks and servers.

Figure 2:
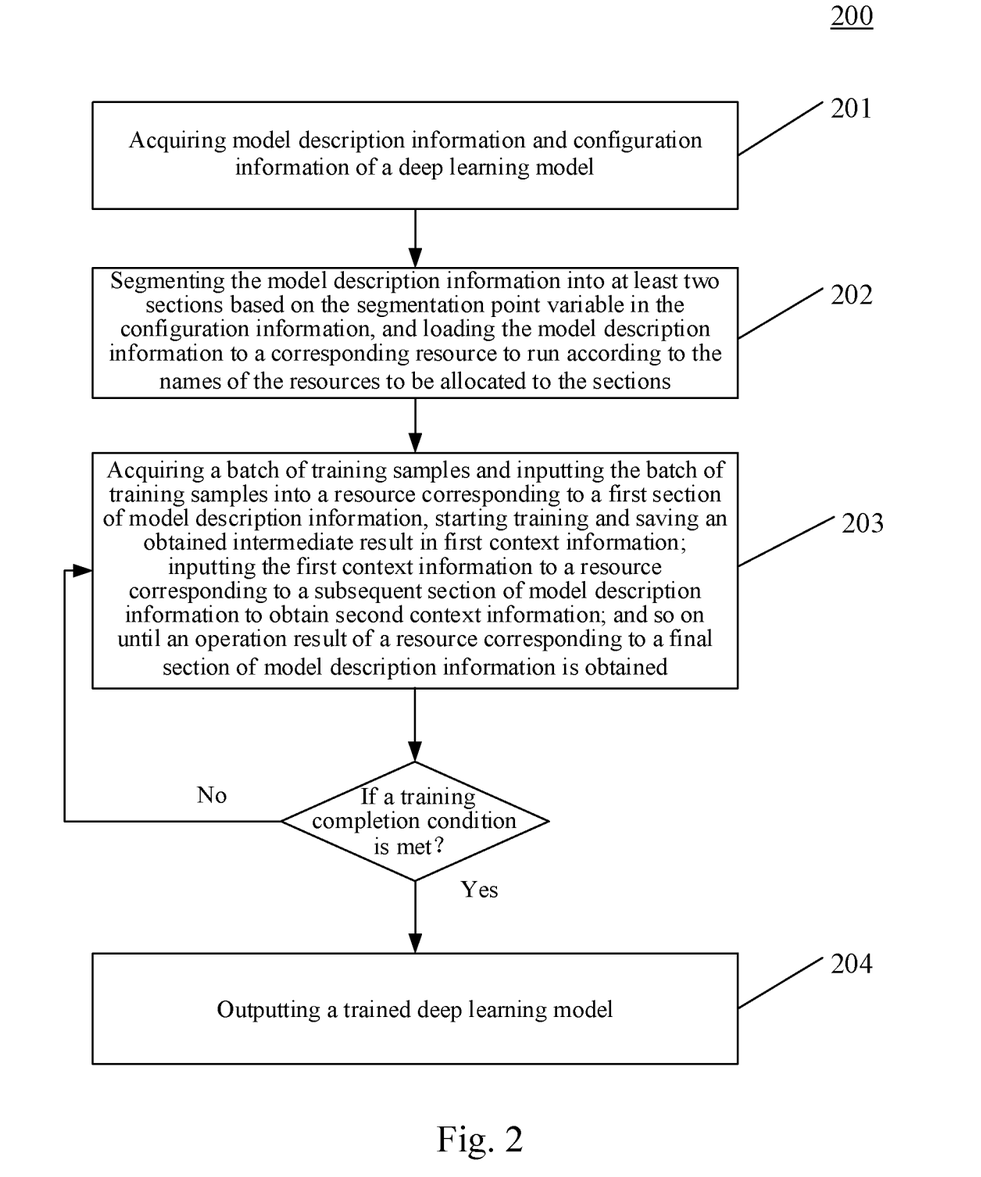
FIG. 2 is a flowchart of a method for training a deep learning model according to an embodiment of the present disclosure.

With further reference to FIG. 2, a flow 200 of a method for training a deep learning model according to an embodiment of the present disclosure is illustrated. The method for training a deep learning model includes the following steps.

Step 201, acquiring model description information and configuration information of a deep learning model.

In the present embodiment, an executing body of the method for training a deep learning model (for example, the server shown in FIG. 1) may receive a training request from a terminal that a user uses for model training through wired or wireless connections. The training request may include the model description information and the configuration information of the deep learning model. The training request may further include training samples. The model description information includes a variable and an operation, and the configuration information includes a segmentation point variable and names of resources to be allocated to sections. First, some terms are defined. A complete deep learning model is described by Program (model description information), which mainly includes two entities: operation (i.e., OP) and variable. For example, full connection operation and embedding lookup operation may be regarded as a kind of OP. However, parameters of the network and intermediate representation of various data are all described by Variable. The model description information may be written using Python language. The back end converts the model description information written using Python language into an executable C++ program to run on a specified resource (CPU or GPU).

Step 202, segmenting the model description information into at least two sections based on the segmentation point variable in the configuration information, and loading the model description information to a corresponding resource to run according to the names of the resources to be allocated to the sections.

In the present embodiment, the configuration information includes the segmentation point variable and the names of the resources to be allocated to the sections. The user sets where to segment using the configuration information, and on which device each section of the model description information runs after the segmentation. The segmentation point variable may be manually selected, or a variable at the intersection of forward calculation and loss value calculation may be determined by the program as the segmentation point variable. In ordinary training, a Program as a whole may run on a certain device (such as the GPU or the CPU). A pipeline parallelism supports segmenting the Program into at least two sections (referred to as Section), and each Section may specify the device to run on. Here, the idea of model parallelism is continued. Specifically, the user may specify a pipeline segmentation point (the segmentation point is a Variable or a list of Variables, that is, there may be a plurality of segmentation point variables) in a custom forward Program, and according to the above, the server may segment a complete Program including forward, backward, and optimization into a plurality of Sections, and Program of the Sections obtained by the segmentation describe respective calculations. The forward part involves a forward propagation process of neural network training, and the backward part, also called reverse part, involves a back propagation of neural network training. Another part is also used to calculate a loss value. Segmentation may be performed directly based on the segmentation point variable, and a gradient variable corresponding to the segmentation point variable may also be automatically set as another segmentation point variable for segmentation. In other words, a segmentation point variable may be set and three sections may be segmented out. If K segmentation point variables are set, 2K+1 sections may be segmented out.

Figure 3A:
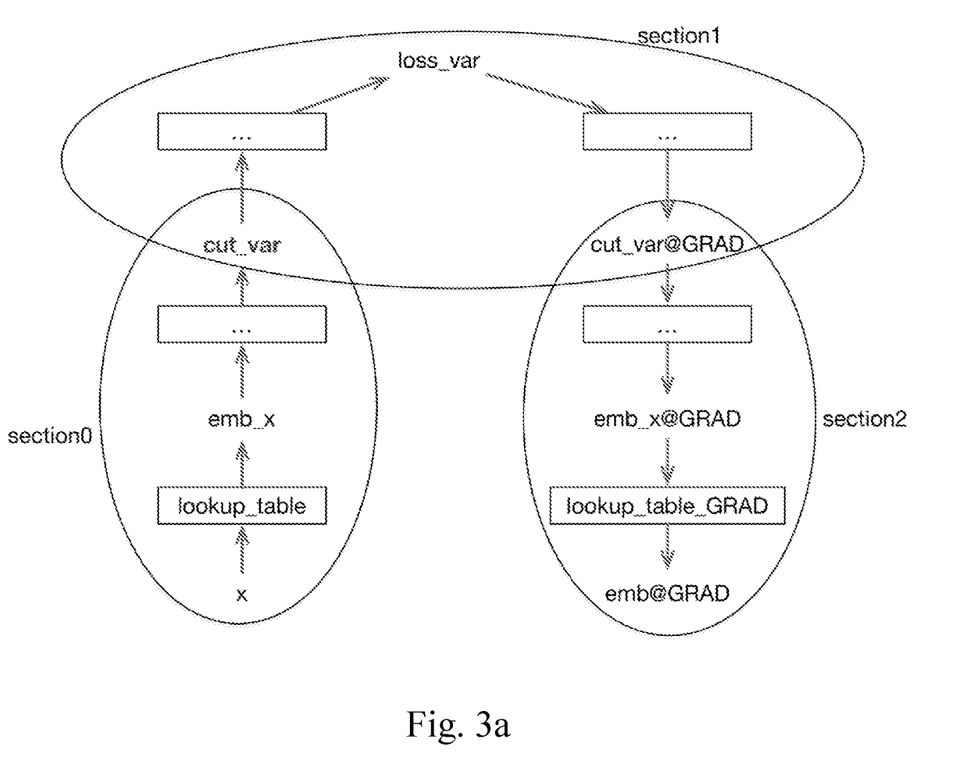
FIG. 3a and FIG. 3b are schematic diagrams of an application scenario of the method for training a deep learning model according to embodiments of the present disclosure.

FIG. 3a describes a complete example. A complete Program, including two parts: forward (left) and reverse (right). The user specifies the variable cut_var as the segmentation point, so the pipeline framework may segment the whole Program into following three parts.

1. A forward part with cut_var as the end point (section0 in the figure).

2. A remaining forward part starting from cut_var, plus a part starting from loss to cut_var@GRAD of a reverse part (section1 in the figure). It should be noted that cut_var@GRAD is the gradient variable corresponding to cut_var in a reverse network.

3. A remaining reverse part starting from cut_var@GRAD (section2 in the figure).

After completing the above segmentation of the Program, the configuration information may specify the operating device for each Section. For example, specify section0 to run on the CPU, and section1 to run on the GPU, and so on. This function makes use of the pipeline parallelism framework for training, which may make full use of each device provided by a machine. The principle of distribution is that model description information that frequently interacts with the memory, such as data loading, preprocessing and dumping, starting data transmission and function calling on the GPU, starting network transmission, etc., is specified to run on the CPU. Model description information related to intensive computing is allocated to the GPU for execution. For example, calculation and update operations of embedding lookup are performed in the CPU with faster memory interaction, and computationally intensive operations such as matrix multiplication are performed in the GPU with faster calculating speed. In addition, by allocating different proportions of computing resources to the operations having different characteristics and executing the operations asynchronously and concurrently, it may give full play to the computing power of different computing devices and an overall throughput may be improved.

The model description information may be written in Python language, and then converted into executable programs such as C++ to run on allocated resources.

Step 203, acquiring a batch of training samples and inputting the batch of training samples into a resource corresponding to a first section of model description information, starting training and saving an obtained intermediate result in first context information; inputting the first context information to a resource corresponding to a subsequent section of model description information to obtain second context information; and so on until an operation result of a resource corresponding to a final section of model description information is obtained.

In the present embodiment, considering the universality of a Paddle deep learning framework, basic concepts of the Paddle framework are followed and this function is implemented by briefly transforming and extending some of the entities. When the user describes the network on the Python side, configuration information such as the specified Program segmentation point, the type of device running each Section and the degree of parallelism is sent to a backend (c++) training engine in the proto format, so that the backend may obtain various configuration information during runtime, and perform a series of operations such as subsequent initialization and calculation.

Here, a concept that may be frequently used later is briefly introduced-Scope. Scope is an important general concept in Paddle, which is used to store context information in a batch sample calculation process, such as an intermediate variable. If the same Program runs in a plurality of different Scopes, then the different Scopes isolate the variable and do not interfere with each other. However, in the design of the pipeline parallelism, Scope is transferred as a communication entity between adjacent sections, which is created at the beginning of the entire program and is transferred in sequence in the Sections during the execution. The following ScopeQueue is a queue that saves the Scopes.

The Paddle framework includes a component (class) SectionWorker, which is used to manage the entire calculation process on a Section. The main tasks include following contents.

1. In the initialization phase, the SectionWorker creates an OP on the Section based on inputted proto configuration information.

2. In the execution phase, the SectionWorker blocks to wait and acquires Scope resources from the input Queue; completes the calculation described in the Program based on the current Scope; and puts the Scope containing a calculation result into the output Queue.

The Paddle framework includes a component (class) PipelineTrainer, which is used to manage the life cycle of a plurality of SectionWorkers. The main tasks include following contents.

1. The PipelineTrainer performs space development and initialization of global resources: such as creating SectionWorker, generating an OP list for each SectionWorker, or creating an entity such as a Scope queue between adjacent Sections.

2. The PipelineTrainer realizes a startup and necessary scheduling of the pipeline parallelism. For example, for each SectionWorker, logics such as execution of a thread and synchronization between threads are created.

It is worth mentioning that in order to reuse the storage resources requested in a calculation Scope, the PipelineTrainer creates enough Scopes at one time during initialization and destroys the Scopes after the training.

Figure 3B:
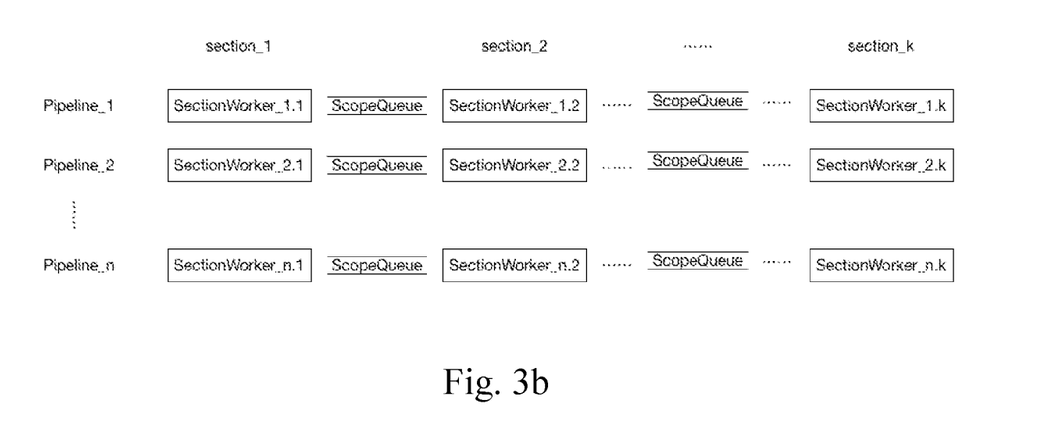

An intuitive presentation of the above content is as shown in FIG. 3b.

Step 204, if a training completion condition is met, outputting a trained deep learning model.

In the present embodiment, the training completion condition may include the loss value being less than a predetermined value or the number of training times reaching an upper limit. The deep learning model is outputted when the training is completed. The deep learning model may be returned to the terminal device or sent to a publishing server for use by other users. If the training is not completed, update a subsequent batch of training samples, and keep on perform step 203.

Figure 4:
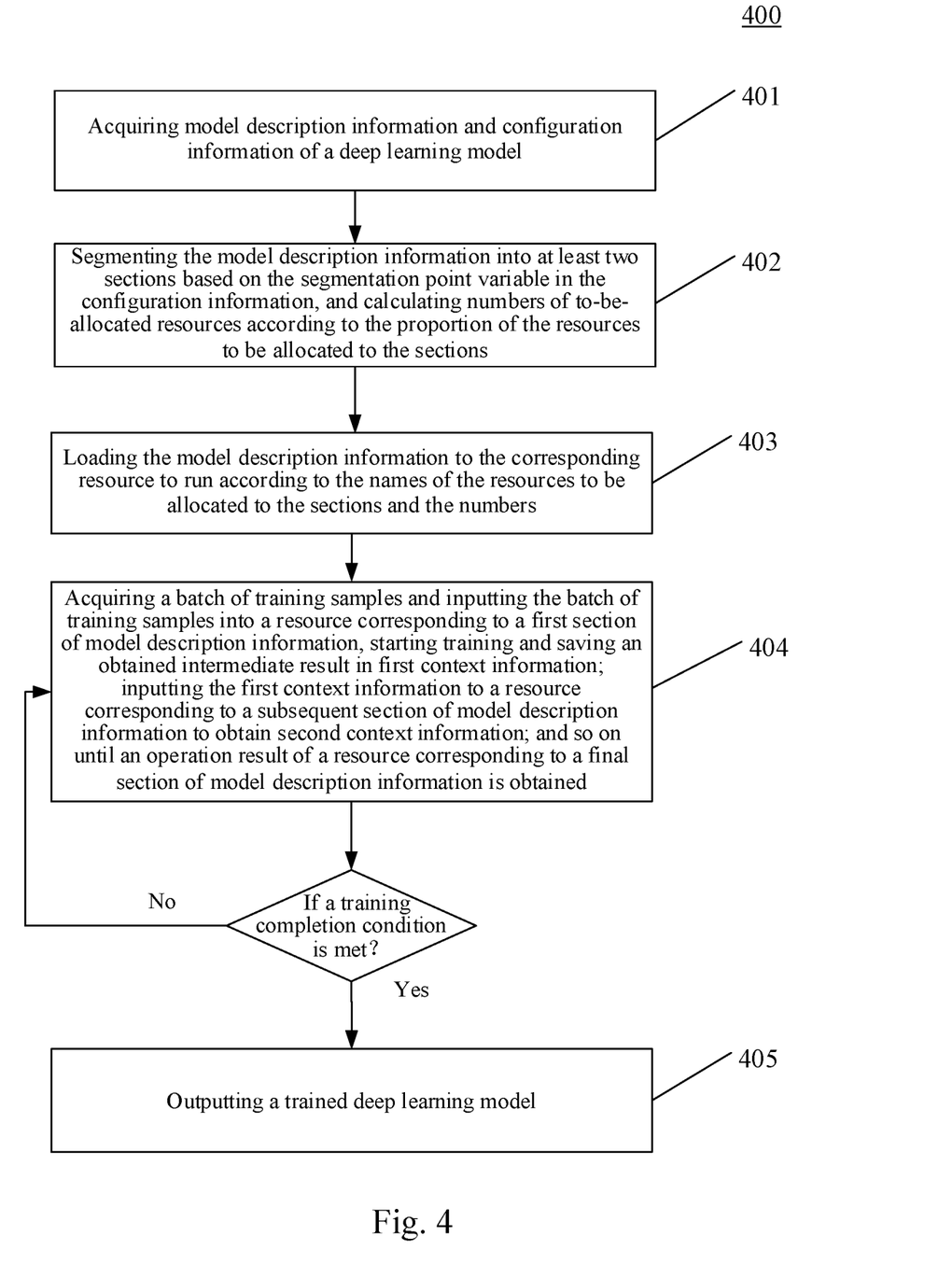
FIG. 4 is a flowchart of the method for training a deep learning model according to another embodiment of the present disclosure.

With further reference to FIG. 4, a flow 400 of another embodiment of the method for training a deep learning model is illustrated. The flow 400 of the method for training a deep learning model includes the following steps.

Step 401, acquiring model description information and configuration information of a deep learning model.

Step 401 is basically the same as step 201, therefore detailed description thereof will be omitted.

Step 402, segmenting the model description information into at least two sections based on the segmentation point variable in the configuration information, and calculating numbers of to-be-allocated resources according to the proportion of the resources to be allocated to the sections.

Step 402 is basically the same as step 202, the difference is that the configuration information includes the proportion of the resources to be allocated to the sections, that is, the degree of parallelism of each section. For example, section0 running on the CPU uses how many threads for training, section1 running on the GPU uses how many GPU cards for training, etc. This method of supporting the configuration of the proportion of the computing resources may fully compensate waiting time caused by different computing speeds of different devices. For example, in the above network, if the calculation time of section1 is 5 times that of section2, then the calculation resources of section1 and section2 may be allocated to be 5:1 to make the running time of the two sections close, so as to make full use of the computing resources of the devices.

Step 403, loading the model description information to the corresponding resource to run according to the names of the resources to be allocated to the sections and the numbers.

Step 404, acquiring a batch of training samples and inputting the batch of training samples into a resource corresponding to a first section of model description information, starting training and saving an obtained intermediate result in first context information; inputting the first context information to a resource corresponding to a subsequent section of model description information to obtain second context information; and so on until an operation result of a resource corresponding to a final section of model description information is obtained.

Step 405, if a training completion condition is met, outputting a trained deep learning model.

Steps 403-405 are basically the same as steps 202-204, therefore detailed description thereof will be omitted.

Figure 5:
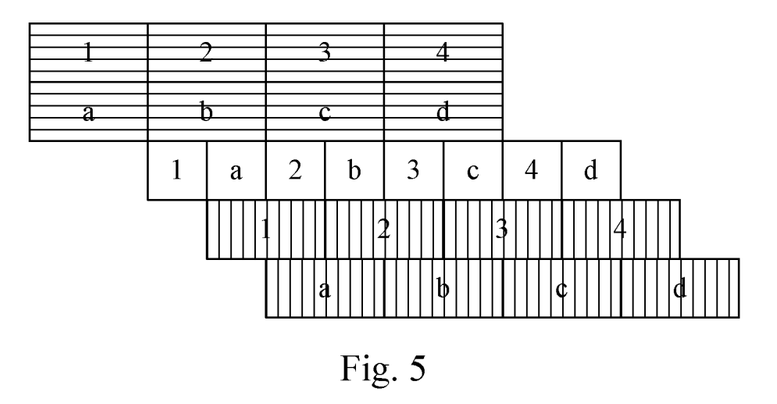
FIG. 5 is a schematic diagram of another application scenario of the method for training a deep learning model according to an embodiment of the present disclosure.

As can be seen from FIG. 4, compared with the embodiment corresponding to FIG. 2, the flow 400 of the method for training a deep learning model in the present embodiment innovatively uses the characteristics of heterogeneous devices and supports the configuration of the proportion of the computing resources, to maximize the use of high-throughput computing devices, so that the overall performance of the system is maximized. As shown in FIG. 5, by configuring the use proportion of horizontal stripes: no stripes: vertical stripes resources to be 2:1:2, full utilization rate of all the devices may be achieved. Here, 1-4, a-d respectively represent data to be processed. Horizontal stripes and vertical stripes represent 2 CPU processing, and no stripes represents 1 GPU processing. The GPU has a faster processing speed than the CPU, so that the time width occupied in the horizontal direction is less.

In addition to the above innovation points, the present disclosure further naturally supports data parallelism expansion. That is, the above modified Program is completely copied in a plurality of copies, and then the data is split into corresponding copies and training is performed at the same time.

It can be seen that the present disclosure has both the capabilities of model parallelism and data parallelism. While integrating the capabilities of the model parallelism and data parallelism, the function of supporting heterogeneous devices and supporting the allocation of the proportion of the computing resources of different devices is further added, thereby further enriching the training mode.

Figure 6:
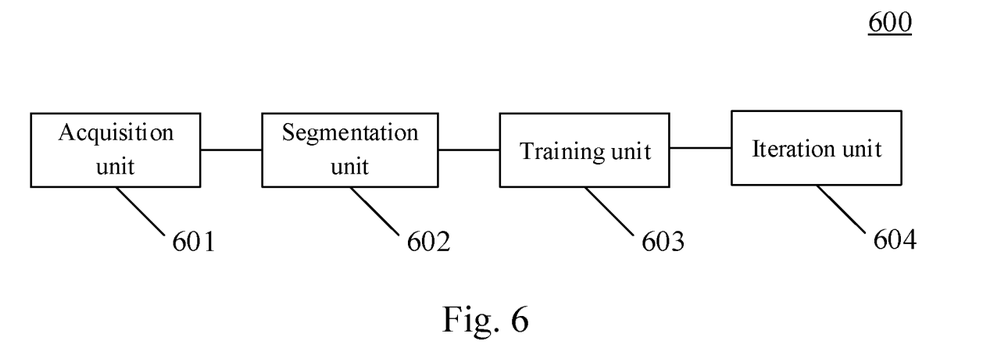
FIG. 6 is a schematic structural diagram of an apparatus for training a deep learning model according to an embodiment of the present disclosure.

With further reference to FIG. 6, as an implementation of the method shown in the above figures, an embodiment of the present disclosure provides an apparatus for training a deep learning model, and the apparatus embodiment corresponds to the method embodiment as shown in FIG. 2. The apparatus may be specifically applied to various electronic devices.

As shown in FIG. 6, the apparatus for training a deep learning model of the present embodiment includes: an acquisition unit 601, a segmentation unit 602, a training unit 603 and an iteration unit 604. The acquisition unit 601 is configured to acquire model description information and configuration information of a deep learning model, the model description information including a variable and an operation, and the configuration information including a segmentation point variable and names of resources to be allocated to sections. The segmentation unit 602 is configured to segment the model description information into at least two sections based on the segmentation point variable in the configuration information, and load the model description information to a corresponding resource to run according to the names of the resources to be allocated to the sections. The training unit 603 is configured to perform following training steps: acquiring a batch of training samples and inputting the batch of training samples into a resource corresponding to a first section of model description information, starting training and saving an obtained intermediate result in first context information; inputting the first context information to a resource corresponding to a subsequent section of model description information to obtain second context information; and so on until an operation result of a resource corresponding to a final section of model description information is obtained; if a training completion condition is met, outputting a trained deep learning model. The iteration unit 604 is configured to, if the training completion condition is not met, keeping on acquiring a subsequent batch of training samples and perform the above training steps until the training completion condition is met.

In the present embodiment, the specific processing of the acquisition unit 601, the segmentation unit 602, the training unit 603 and the iteration unit 604 of the apparatus 600 for training a deep learning model may refer to step 201, step 202, step 203 and step 204 in the corresponding embodiment in FIG. 2.

In some alternative implementations of the present embodiment, the configuration information further includes a proportion of the resources to be allocated to the sections; and the segmentation unit 602 is further configured to: calculate numbers of to-be-allocated resources according to the proportion of the resources to be allocated to the sections; and load the model description information to the corresponding resource to run according to the names of the resources to be allocated to the sections and the numbers.

In some alternative implementations of the present embodiment, the segmentation unit 602 is further configured to: determine a forward part that ends with the segmentation point variable as a first section; determine a remaining forward part starting from the segmentation point variable plus a part from a loss part to a gradient variable corresponding to the segmentation point variable as a second section; and determine a remaining reverse part starting from the gradient variable corresponding to the segmentation point variable as a third section.

In some alternative implementations of the present embodiment, the acquisition unit 601 is further configured to: determine a conversion variable between an operation with frequent memory interaction and a computationally intensive operation as the segmentation point variable, based on an operation of the model description information; allocate the operation with frequent memory interaction to a CPU for execution; and allocate the computationally intensive operation to a GPU for execution.

In some alternative implementations of the present embodiment, the apparatus 600 further includes a merging unit (not shown in the figure), configured to: split the training samples into a predetermined number of copies; train using each copy of training sample to obtain a set of parameters of the deep learning model; and synchronize each set of parameters of the deep learning model once every certain round. For example, the average value of each set of parameters of the deep learning model is determined as phased parameters of the deep learning model for synchronization.

In some alternative implementations of the present embodiment, the context information is transferred through a queue.

Figure 7:
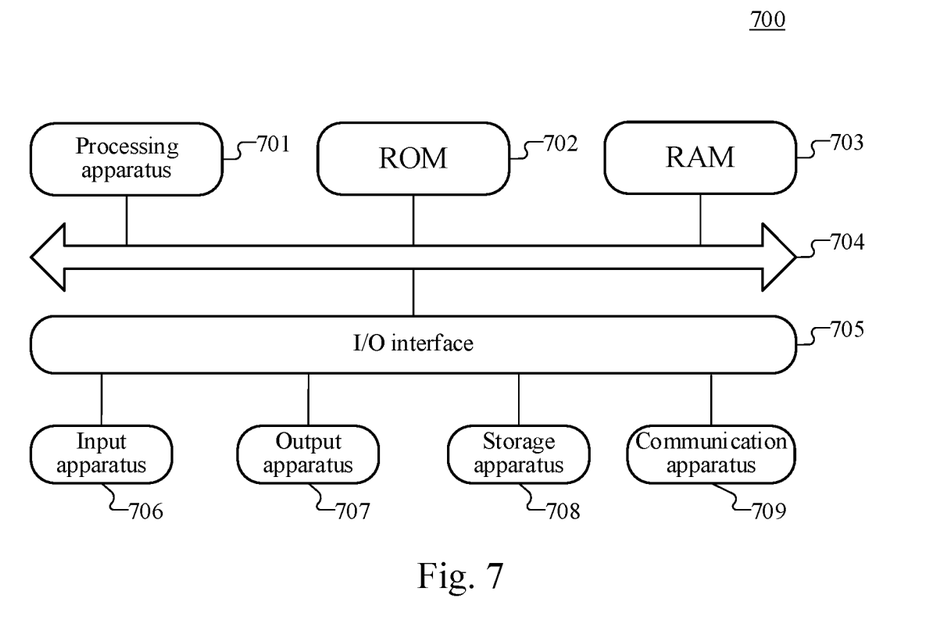
FIG. 7 is a schematic structural diagram of a computer system of an electronic device suitable for implementing embodiments of the present disclosure.

With further reference to FIG. 7, a schematic structural diagram of an electronic device (for example, the server or terminal device in FIG. 1) 700 suitable for implementing embodiments of the present disclosure is illustrated. The terminal device in embodiments of the present disclosure may include, but is not limited to, mobile terminals such as mobile phones, laptops, digital broadcast receivers, PDAs (personal digital assistants), PADs (tablets), PMPs (portable multimedia players), vehicle-mounted terminals (such as vehicle-mounted navigation terminals) and fixed terminals such as digital TVs, or desktop computers. The terminal device/server shown in FIG. 7 is only an example, and should not bring any limitation to the functions and scope of use of embodiments of the present disclosure.

As shown in FIG. 7, the electronic device 700 may include a processing apparatus (for example, a central processing unit, a graphics processor, etc.) 701, which may perform various appropriate actions and processes according to a program stored in a read only memory (ROM) 702 or a program loaded from a storage apparatus 708 into a random access memory (RAM) 703. In the RAM 703, various programs and data required for the operation of the electronic device 700 are also stored. The processing apparatus 701, the ROM 702, and the RAM 703 are connected to each other through a bus 704. An input/output (I/O) interface 705 is also connected to the bus 704.

Generally, the following apparatuses may be connected to the I/O interface 705: an input apparatus 706 including such as a touch screen, a touch pad, a keyboard, a mouse, a camera, a microphone, an accelerometer, or a gyroscope; an output apparatus 707 including such as a liquid crystal display (LCD), a speaker, a vibrator; the storage apparatus 708 including such as a magnetic tape, a hard disk; and a communication apparatus 709. The communication apparatus 709 may allow the electronic device 700 to perform wireless or wired communication with other devices to exchange data. Although FIG. 7 shows the electronic device 700 having various apparatuses, it should be understood that it is not required to implement or provide all the illustrated apparatuses. It may alternatively be implemented or provided with more or fewer apparatuses. Each block shown in FIG. 7 may represent one apparatus, or may represent a plurality of apparatuses as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for performing the method as illustrated in the flow chart. In such an embodiment, the computer program may be downloaded and installed from a network using the communication apparatus 709, or installed from the storage apparatus 708, or installed from the ROM 702. The computer program, when executed by the processing apparatus 701, implements the above mentioned functionalities as defined by the method of embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The above computer readable medium may be included in the electronic device; or it may exist alone without being assembled into the electronic device. The computer readable medium carries one or more programs, the one or more programs, when executed by the electronic device, cause the electronic device to: acquire model description information and configuration information of a deep learning model, the model description information including a variable and an operation, and the configuration information including a segmentation point variable and names of resources to be allocated to sections; segment the model description information into at least two sections based on the segmentation point variable in the configuration information, and loading the model description information to a corresponding resource to run according to the names of the resources to be allocated to the sections; perform following training steps: acquiring a batch of training samples and inputting the batch of training samples into a resource corresponding to a first section of model description information, starting training and saving an obtained intermediate result in first context information; inputting the first context information to a resource corresponding to a subsequent section of model description information to obtain second context information; and son on until an operation result of a resource corresponding to a final section of model description information is obtained; if a training completion condition is met, outputting a trained deep learning model; and otherwise, keeping on acquiring a subsequent batch of training samples and performing the above training steps until the training completion condition is met.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments described in the present disclosure may be implemented by software or hardware. The described units may also be provided in a processor, for example, may be described as: a processor including an acquisition unit, a segmentation unit, a training unit and an iteration unit. Here, the names of these units do not constitute a limitation on the unit itself under certain circumstances. For example, the acquisition unit may also be described as "a unit configured to acquire model description information and configuration information of a deep learning model."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for training a deep learning model, the method comprising:

acquiring model description information and configuration information of the deep learning model, the model description information comprising at least one variable and operations of the deep learning model, and the configuration information comprising a segmentation point variable and names of resources to be allocated to sections of the model description information, wherein the segmentation point variable is a predefined variable for segmenting the model description information, and the operations of the deep learning model comprise a first operation related to a first process of training the deep learning model, and a second operation related to a second process of training the deep learning model, the first process being different from the second process;

segmenting the model description information into at least two sections comprising a first section and a second section based on the segmentation point variable in the configuration information, and loading the model description information to a corresponding resource to run according to the names of the resources to be allocated to the sections, wherein the configuration information further comprises a computing power ratio between a first computing power to be allocated to the first section and a second computing power to be allocated to the second section, and the computing power ratio is determined by equating, with a predetermined speed ratio between a first calculation speed of the first computing power and a second calculation speed of the second computing power, a first time period required for training the first section using the first computing power, to a second time period required for training the second section using the second computing power, and wherein the first section comprises the first operation, and the second section comprises the second operation, and the loading comprises: loading the first section comprising the first operation related to the first process of training the deep learning model to a first hardware resource with the first computing power, and loading the second section comprising the second operation related to the second process of training the deep learning model to a second hardware resource with the second computing power, the second hardware resource being different from the first hardware resource;

performing following training steps: acquiring a batch of training samples and inputting the batch of training samples into the first hardware resource loaded with the first section comprising the first operation related to the first process of training the deep learning model, starting training and saving an obtained intermediate result in first context information; inputting the first context information to the second hardware resource loaded with the second section comprising the second operation related to the second process of training the deep learning model to obtain second context information; and so on until an operation result of a resource corresponding to a final section of the sections of the model description information is obtained; and if a training completion condition is met, outputting a trained deep learning model; otherwise, keeping on acquiring a subsequent batch of training samples and performing the above training steps until the training completion condition is met.

2. The method according to claim 1, wherein the first hardware resource is a CPU, the second hardware resource is a GPU, and the configuration information comprises a ratio between a computing power of the CPU and a computing power of the GPU.

3. The method according to claim 1, wherein the segmenting the model description information into at least two sections comprises:

determining a forward part that ends with the segmentation point variable as the first section, wherein the forward part is related to a forward propagation process of neural network training;

determining a remaining forward part starting from the segmentation point variable plus a part from a loss part to a gradient variable corresponding to the segmentation point variable as the second section, wherein the remaining forward part is related to calculating a loss value; and determining a remaining reverse part starting from the gradient variable corresponding to the segmentation point variable as a third section, wherein the remaining reverse part is related to a back propagation of neural network training.

4. The method according to claim 1, wherein the acquiring the model description information and the configuration information of the deep learning model comprises:

determining a variable between an operation with frequent memory interaction and a computationally intensive operation as the segmentation point variable, based on the operations of the model description information;

allocating the operation with frequent memory interaction to a CPU for execution; and allocating the computationally intensive operation to a GPU for execution.

5. The method according to claim 1, wherein the method further comprises:

splitting the training samples into a predetermined number of copies;

training using each copy of the training samples to obtain a set of parameters of the deep learning model; and synchronizing each set of parameters of the deep learning model once every certain round.

6. The method according to claim 1, wherein the first context information and the second context information are transferred through a queue.

7. An electronic device, comprising:

one or more processors; and a storage apparatus, storing one or more programs thereon, the one or more programs, when executed by the one or more processors, causing the one or more processors to perform operations comprising:

acquiring model description information and configuration information of a deep learning model, the model description information comprising at least one variable and operations of the deep learning model, and the configuration information comprising a segmentation point variable and names of resources to be allocated to sections of the model description information, wherein the segmentation point variable is a predefined variable for segmenting the model description information, and the operations of the deep learning model comprise a first operation related to a first process of training the deep learning model, and a second operation related to a second process of training the deep learning model, the first process being different from the second process;

segmenting the model description information into at least two sections comprising a first section and a second section based on the segmentation point variable in the configuration information, and loading the model description information to a corresponding resource to run according to the names of the resources to be allocated to the sections, wherein the configuration information further comprises a computing power ratio between a first computing power to be allocated to the first section and a second computing power to be allocated to the second section, and the computing power ratio is determined by equating, with a predetermined speed ratio between a first calculation speed of the first computing power and a second calculation speed of the second computing power, a first time period required for training the first section using the first computing power, to a second time period required for training the second section using the second computing power, and wherein the first section comprises the first operation, and the second section comprises the second operation, and the loading comprises: loading the first section comprising the first operation related to the first process of training the deep learning model to a first hardware resource with the first computing power, and loading the second section comprising the second operation related to the second process of training the deep learning model to a second hardware resource with the second computing power, the second hardware resource being different from the first hardware resource;

performing following training steps: acquiring a batch of training samples and inputting the batch of training samples into the first hardware resource loaded with the first section comprising the first operation related to the first process of training the deep learning model, starting training and saving an obtained intermediate result in first context information; inputting the first context information to the second hardware resource loaded with the second section comprising the second operation related to the second process of training the deep learning model to obtain second context information; and so on until an operation result of a resource corresponding to a final section of the sections of the model description information is obtained; and if a training completion condition is met, outputting a trained deep learning model; otherwise, keeping on acquiring a subsequent batch of training samples and performing the above training steps until the training completion condition is met.

8. The electronic device according to claim 7, wherein the first hardware resource is a CPU, the second hardware resource is a GPU, and the configuration information comprises a ratio between a computing power of the CPU and a computing power of the GPU.

9. The electronic device according to claim 7, wherein the segmenting the model description information into at least two sections comprises:
determining a forward part that ends with the segmentation point variable as the first section, wherein the forward part is related to a forward propagation process of neural network training;
determining a remaining forward part starting from the segmentation point variable plus a part from a loss part to a gradient variable corresponding to the segmentation point variable as the second section, wherein the remaining forward part is related to calculating a loss value; and
determining a remaining reverse part starting from the gradient variable corresponding to the segmentation point variable as a third section, wherein the remaining reverse part is related to a back propagation of neural network training.

10. The electronic device according to claim 7, wherein the acquiring the model description information and the configuration information of the deep learning model comprises:
determining a variable between an operation with frequent memory interaction and a computationally intensive operation as the segmentation point variable, based on the operations of the model description information;
allocating the operation with frequent memory interaction to a CPU for execution; and
allocating the computationally intensive operation to a GPU for execution.

11. The electronic device according to claim 7, wherein the operations further comprise:
splitting the training samples into a predetermined number of copies;
training using each copy of the training samples to obtain a set of parameters of the deep learning model; and
synchronizing each set of parameters of the deep learning model once every certain round.

12. The electronic device according to claim 7, wherein the first context information and the second context information are transferred through a queue.

13. A non-transitory computer readable medium storing a computer program thereon, the computer program, when executed by one or more processors, causing the one or more processors to perform operations comprising:
acquiring model description information and configuration information of a deep learning model, the model description information comprising at least one variable and operations of the deep learning model, and the configuration information comprising a segmentation point variable and names of resources to be allocated to sections of the model description information, wherein the segmentation point variable is a predefined variable for segmenting the model description information, and the operations of the deep learning model comprise a first operation related to a first process of training the deep learning model, and a second operation related to a second process of training the deep learning model, the first process being different from the second process;
segmenting the model description information into at least two sections comprising a first section and a second section based on the segmentation point variable in the configuration information, and loading the model description information to a corresponding resource to run according to the names of the resources to be allocated to the sections, wherein the configuration information further comprises a computing power ratio between a first computing power to be allocated to the first section and a second computing power to be allocated to the second section, and the computing power ratio is determined by equating, with a predetermined speed ratio between a first calculation speed of the first computing power and a second calculation speed of the second computing power, a first time period required for training the first section using the first computing power, to a second time period required for training the second section using the second computing power, and wherein the first section comprises the first operation, and the second section comprises the second operation, and the loading comprises: loading the first section comprising the first operation related to the first process of training the deep learning model to a first hardware resource with the first computing power, and loading the second section comprising the second operation related to the second process of training the deep learning model to a second hardware resource with the second computing power, the second hardware resource being different from the first hardware resource;
performing following training steps: acquiring a batch of training samples and inputting the batch of training samples into the first hardware resource loaded with the first section comprising the first operation related to the first process of training the deep learning model, starting training and saving an obtained intermediate result in first context information; inputting the first context information to the second hardware resource loaded with the second section comprising the second operation related to the second process of training the deep learning model to obtain second context information; and so on until an operation result of a resource corresponding to a final section of the sections of the model description information is obtained; and
if a training completion condition is met, outputting a trained deep learning model; otherwise, keeping on acquiring a subsequent batch of training samples and performing the above training steps until the training completion condition is met.

14. The non-transitory computer readable medium according to claim 13, wherein the first hardware resource is a CPU, the second hardware resource is a GPU, and the configuration information comprises a ratio between a computing power of the CPU and a computing power of the GPU.

15. The non-transitory computer readable medium according to claim 13, wherein the segmenting the model description information into at least two sections comprises:
  determining a forward part that ends with the segmentation point variable as the first section, wherein the forward part is related to a forward propagation process of neural network training;
  determining a remaining forward part starting from the segmentation point variable plus a part from a loss part to a gradient variable corresponding to the segmentation point variable as the second section, wherein the remaining forward part is related to calculating a loss value; and
  determining a remaining reverse part starting from the gradient variable corresponding to the segmentation point variable as a third section, wherein the remaining reverse part is related to a back propagation of neural network training.

16. The non-transitory computer readable medium according to claim 13, wherein the acquiring the model description information and the configuration information of the deep learning model comprises:
  determining a variable between an operation with frequent memory interaction and a computationally intensive operation as the segmentation point variable, based on the operations of the model description information;
  allocating the operation with frequent memory interaction to a CPU for execution; and
  allocating the computationally intensive operation to a GPU for execution.

17. The non-transitory computer readable medium according to claim 13, wherein the operations further comprise:
  splitting the training samples into a predetermined number of copies;
  training using each copy of the training samples to obtain a set of parameters of the deep learning model; and
  synchronizing each set of parameters of the deep learning model once every certain round.

18. The non-transitory computer readable medium according to claim 13, wherein the first context information and the second context information are transferred through a queue.

* * * * *